United States Patent

[11] 3,555,199

[72] Inventors Carol H. Eubank
Cedar Hills;
Daniel L. Miller, Indianapolis, Ind.
[21] Appl. No. 764,231
[22] Filed Oct. 1, 1968
[45] Patented Jan. 12, 1971
[73] Assignee Bell Telephone Laboratories, Incorporated
Murray Hill; Berkeley Heights, N.J.
a corporation of New York

[54] FRAUD PROTECTED PRESET TELEPHONE
8 Claims, 5 Drawing Figs.

[52] U.S. Cl. 179/18
[51] Int. Cl. H04m 1/66
[50] Field of Search 179/88, 90ADO,B,BD,R, 6.3, 18DC

[56] References Cited
UNITED STATES PATENTS
3,409,741 11/1968 Odom 179/18(.03)

*Primary Examiner*—Kathleen H. Claffy
*Assistant Examiner*—David L. Stewart
*Attorneys*—R. J. Guenther and Edwin B. Cave

ABSTRACT: A telephone in which the closure of the hookswitch energizes a relay that seizes the telephone line and initiates the operation of a sequential switching means if the sequential switching means is in the first of three rest positions. The operated sequential switching means advances to the second rest position wherein an automatic dial may be activated to call a single preselected telephone number and the activation of the dial advances the sequential switching means to the third rest position. The opening of the hookswitch at any time deenergizes the relay to drop the telephone line and returns the sequential switching means to the first rest position.

INVENTORS: C. H. EUBANK
D. L. MILLER
BY
Harry L. Newman
ATTORNEY

FRAUD PROTECTED PRESET TELEPHONE

FIELD OF THE INVENTION

This invention relates to the field of communications and within that field to apparatus, such as a telephone, for automatically transmitting signals that serve to establish a connection between two or more terminals of a communication system.

BACKGROUND OF THE INVENTION

In recent years businesses such as motels and car rental companies have had telephones installed in public locations such as airports and railroad terminals. These telephones permit an individual to call a business without charge to inquire about and obtain the offered accommodations or transportation, and they therefore serve as an inducement for the public to deal with the business.

One way of providing this free telephone service is to connect the telephone at the public location with the business by a direct line. This has the advantage of being quick and simple, inasmuch as no dialing is required, but its cost is high. The alternative is to provide a telephone that includes automatic dialing means and let it establish the connection with the business by utilizing the switched network of the telephone system. This has the advantage of being less expensive, but it involves the risk that a user may circumvent the automatic dialing means and use the telephone to call some other telephone number at the expense of the business providing the telephone service.

One common way of doing this is known as hookswitch dialing. Since the hookswitch closes and opens the telephone line it can be used to duplicate the pulsing of the common rotary dial. That is, by briefly depressing the hookswitch actuator, the hookswitch interrupts the telephone line to transmit a pulse thereover and if for example this is done rapidly five times in a row, the five pulses are interpreted as the digit 5 by the switching equipment at the central office. Consequently once access is gained to the central office switching equipment, the hookswitch actuator can be used in place of a dial.

An object of this invention is to provide a telephone that includes means for automatically dialing a preselected telephone number and also includes means for preventing the use of the telephone for dialing some other telephone number.

SUMMARY OF THE INVENTION

One embodiment of the telephone of the present invention includes a handset, a cradle for accommodating the handset, and a hookswitch that is closed when the handset is removed from the cradle and opened when the handset is placed in the cradle. The closure of the hookswitch energizes a control relay that seizes the telephone line and initiates the operation of sequential switching means. The sequential switching means has three rest positions referred to as the home, call, and talk positions, and the control relay can only be energized when the sequential switching means is in the home position. The energization of the control relay, however, advances the sequential switching means from the home position to the call position wherein a call switch becomes operative.

The user of the telephone listens for the dial tone and then actuates a call button to close the call switch. This causes an automatic dialing means to call a preselected telephone number and advances the sequential switching means from the call position to the talk position. In this position the user converses with the called station and when the conversation is completed he returns the handset to the cradle to open the hookswitch.

The control relay is deenergized any time that the hookswitch is opened, and when deenergized it drops the telephone line and advances the sequential switching means from whatever position it is in to the home position. Since the control relay cannot be again energized to reseize the telephone line until the sequential switching means reaches the home position, hookswitch dialing is prevented by the delay resulting therefrom.

ILLUSTRATIVE EMBODIMENT OF THE INVENTION

Figure 1:
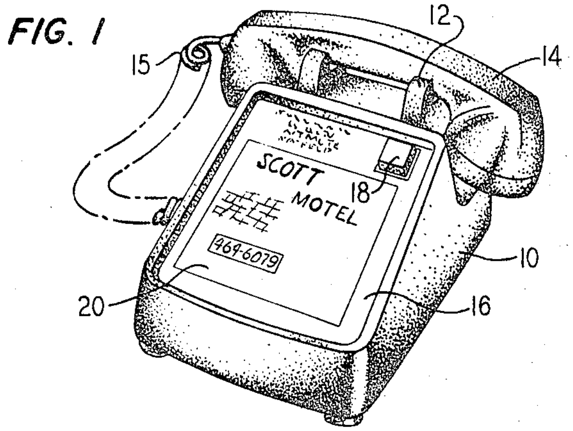
FIG. 1 is a perspective view of a telephone embodying the present invention.

Referring to FIG. 1 of the drawing, a telephone embodying the present invention comprises a base 10 having a cradle 12 that accommodates a handset 14 when the handset is not in use, the handset being joined to the base by a cord 15. The base 10 also has a faceplate 16 through which a call button 18 extends and on which directions for using the telephone are printed, the directions being to lift the handset, wait for dial tone, and press the call button. The central portion of the face plate 16 is transparent and a display card 20 underlying this area includes information identifying the business that is called when the directions are followed.

Figure 2:
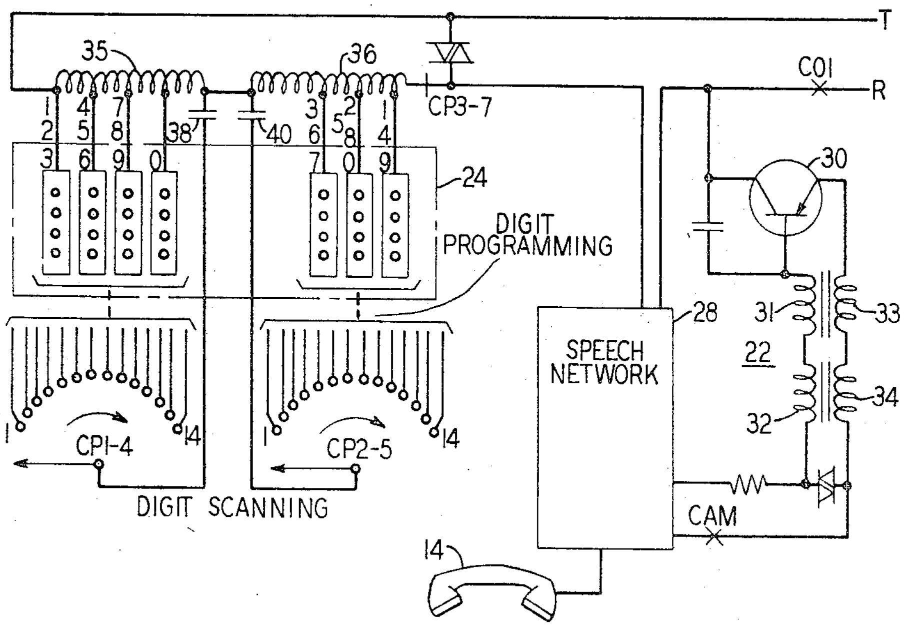
FIG. 2 is a schematic circuit diagram of a dialing circuit.
Figure 3:
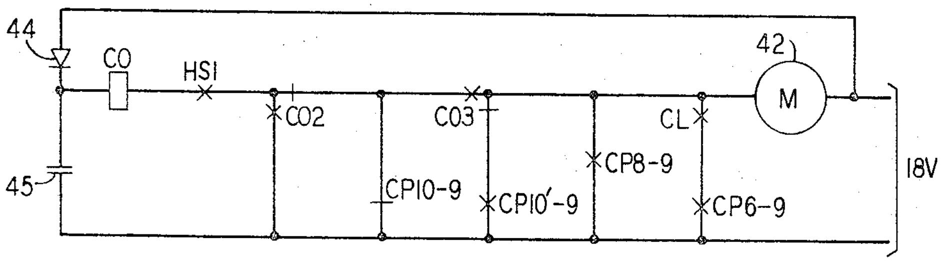
FIG. 3 is a schematic circuit diagram of a relay and motor circuit.

Housed within the base 10 is a dialing circuit and a relay and motor circuit shown schematically in FIGS. 2 and 3, respectively. The dialing circuit comprises a multifrequency signal generator 22, a code block 24 and a pair of stepping switches CP1—4 and CP2—5. The signal generator 22 is integrated with a speech network 28 of which the transmitter and receiver in the handset 14 are a part, and a normally open switch CO1 connects the signal generator and the speech network across the ring and tip conductors of a telephone line. The signal generator 22, the speech network 28, and the interconnection therebetween is basically the same as that disclosed in Reissue U.S. Pat. No. 25,507 issued to L. A. Meacham on Jan. 7, 1964, and since only the signal generator is of interest to the present disclosure, it alone will be briefly described.

The multifrequency signal generator 22 comprises a transistor 30, the base circuit of which has a pair of series windings 31 and 32 and the emitter circuit of which has a pair of series windings 33 and 34. The windings 31 and 33 are wound on a common core with a tapped winding 35, while the windings 32 and 34 are wound on a common core with a tapped winding 36.

The windings 35 and 36 are in series and are connected across the telephone line by a normally closed switch CP3—7. In addition, one end of the winding 35 is connected to one side of a capacitor 38, and when one of the taps on the winding is connected to the other side of the capacitor, a low frequency resonant circuit is provided, the frequency of the circuit being determined by the particular tap that is connected. Similarly, one end of the winding 36 is connected to one side of a capacitor 40 and when one of the taps on the winding is connected to the other side of the capacitor, a high frequency resonant circuit is provided, the frequency of the circuit again being determined by the particular tap that is connected.

The connection of the taps on the windings 35 and 36 with the associated capacitors 38 and 40 is accomplished by means of the code block 24 and the stepping switches CP1—4 and CP2—5. The code block 24 has seven terminal strips, each of which has a plurality of screw terminals, and each terminal strip is connected to an individual tap on the windings 35 and 36, the first four terminal strips being connected to the taps on the winding 35 and the last three terminal strips being connected to the taps on the winding 36. The stepping switches CP1—4 and CP2—5 each have 14 pads, and each pad is provided with a conductor for connection to the terminal strips of the code block 24. The stepping switch CP1—4 is associated with the winding 35 and therefore the pads thereof are connected to the first four terminals strips, while the stepping switch CP2—5 is associated with the winding 36 of and therefore the pads thereof are connected to the last three terminal strips.

As indicated in FIG. 2, each terminal strip of the code block 24 represents a unique grouping of digits and each pad of the stepping switches CP1—4 and CP2—5 corresponds to an individual digit. Consequently, the connection of the pads with the various terminal strips provides a memory in which a number up to 14 digits in length is stored. For example, if the number 464-6079 is to be called, the first pad of the stepping switch CP1—4 is connected to the second terminal strip and the first pad of the stepping switch CP2—5 is connected to the seventh terminal strip to provide the digit 4. The second pad of the stepping switch CP1—4 is connected to the second terminal strip and the second pad of the stepping switch CP2—5 is connected to the fifth terminal strip to provide the digit 6, and so on. The eighth through 14th pads of the stepping switches CP1—4 and CP2—5 will not be connected to any of the terminal strips since the number is only seven digits long.

The stepping switches CP1—4 and CP2—5 when operated sequentially connect the pads thereof to the capacitors 38 and 40, the stepping switches being synchronized so that when a particular pad of the stepping switches CP1—4 is connected to the capacitor 28, the corresponding pad on the stepping switch CP2—5 is connected to the capacitor 40. Pairs of resonant circuits are thereby sequentially formed to provide the readout from the memory and immediately after each pair of resonant circuits is formed, the switch CP3—7 opens, the switch reclosing as each pair of resonant circuits is terminated. In addition, before the stepping switches CP1—4 and CP2—5 commence to form the pairs of resonant circuits, a normally open switch CAM closes and remains closed until after the last pair of resonant circuits has been terminated.

When the switch CO1 is closed to connect the signal generator 22 and speech network 28 across the telephone line, the closing of the switch CAM applies bias voltage to the transistor 30. Then as each pair of resonant circuits is formed, the switch CP3—7 opens to interrupt the flow of current through the windings 35 and 36 and thereby shock excites the resonant circuits into oscillation at the selected frequencies. The transistor 30 acting as an amplifier sustains the oscillations, and they are transmitted out on the telephone line. Thus, a string of multifrequency signals is transmitted that causes the switched network of the central office to establish a connection with the station having the telephone number corresponding to these signals.

Figure 4:
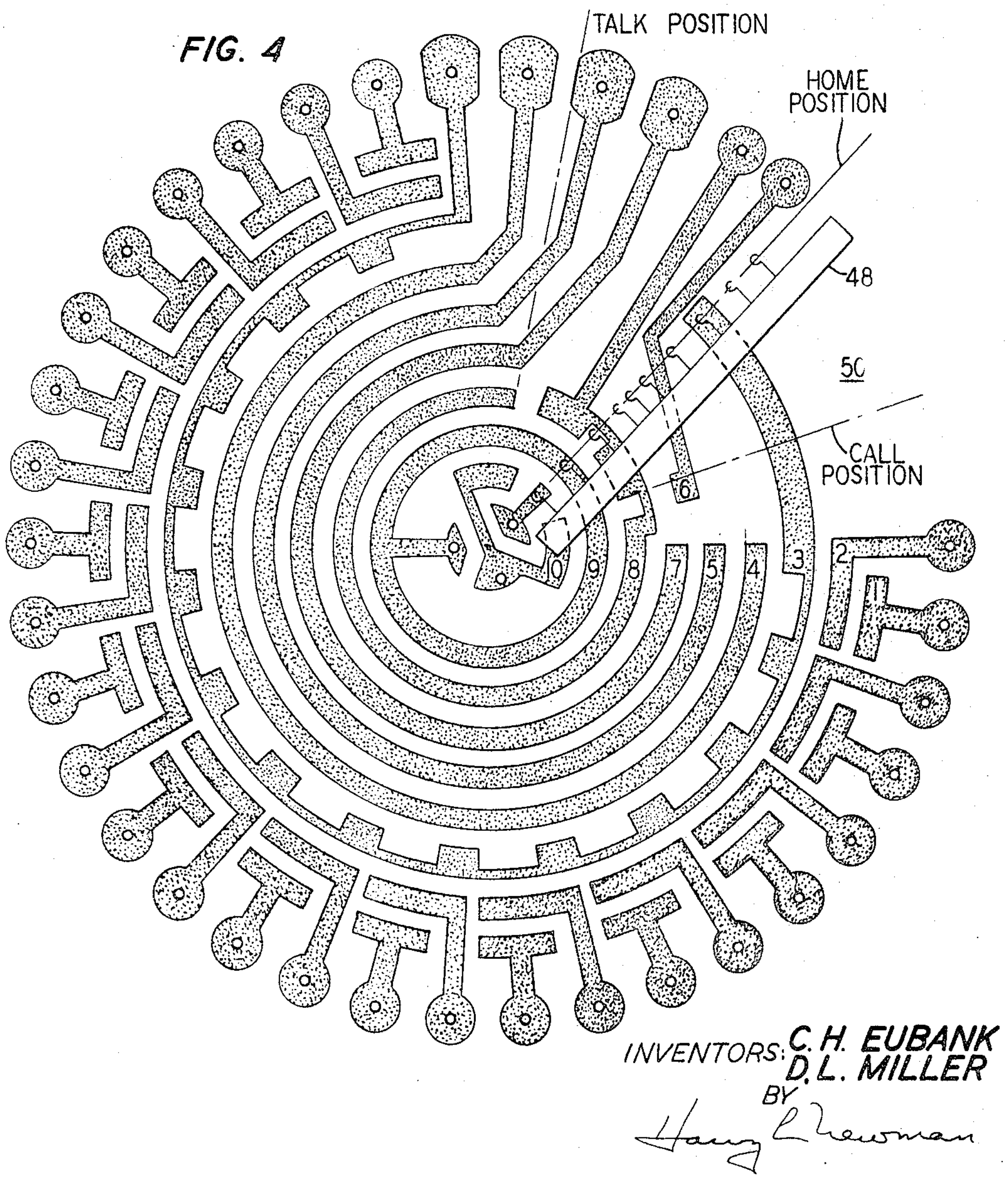
FIG. 4 is a top view of a printed circuit pattern and the commutator that engages it.

Turning now to FIG. 3, the relay and motor circuit is connected across an AC voltage source and includes a control relay CO and a motor 42, a diode 44 and a capacitor 45 providing DC voltage for the relay. The control relay CO operates the normally open switch CO1 in the dialing circuit (FIG. 2) and two transfer switches CO2 and CO3 in the present circuit, while the motor 42 rotates a cam (not shown) to actuate the normally open switch CAM in the dialing circuit. The motor 42 also serves to rotate a commutator 48 past a printed circuit pattern 50 shown in FIG. 4.

The commutator 48 has three reference positions with respect to the circuit pattern 50, these positions being labeled the home position, call position, and talk position. In addition the commutator 48 has ten brushes spaced along a radius of the circuit pattern 50, and when the commutator is rotated, the brushes describe 10 circular paths that coincide with correspondingly numbered conductive paths on the circuit pattern, the 10th brush engaging two separate conductive paths numbered 10 and 10′.

The first brush is electrically connected to the fourth brush, the second brush is electrically connected to the fifth brush, the third brush is electrically connected to the seventh brush, and the sixth, eighth, ninth and 10th brushes are electrically connected together. Thus as the commutator 48 rotates, the conductive paths on the circuit pattern 50 are interconnected in a particular sequence.

Figure 5:
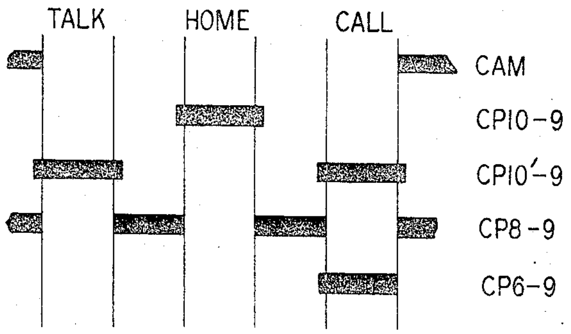
FIG. 5 is a sequence chart showing the sequence of operation of some of the switches in the circuit diagrams.

The interconnection of the conductive paths 1 and 4, and 2 and 5 respectively provide the stepping switches CP1—4 and CP2—5 of the dialing circuit while the interconnection of the conductive paths 3 and 7 provide the excitation switch CP3—7 of the dialing circuit. Furthermore, the interconnection of the conductive paths 6, 8, 9, 10, and 10′ provide sequential switches CP6—9, CP8—9, CP10—9 and CP10′—9 of the relay and motor circuit. The sequence in which these switches and the switch CAM are actuated is shown in FIG. 5 with respect to the three reference positions of the commutator 48, the darkened areas indicating when the individual switches are closed. All the switches are considered to be in their normal condition when the commutator 48 is in the home position.

The sequential switch CP10—9 in combination with the relay switch CO2 and a hookswitch HS1 control the operation of the control relay CO and the sequential switches CP6—9, CP8—9, CP10′—9 and CP10—9 in combination with the relay switch CO3 and a call switch CL control the operation of the motor 42. As in a conventional telephone, the hookswitch HS1 is open when the handset 14 (FIG. 1) is positioned in the cradle 12 and is closed when the handset is removed from the cradle. The call switch CL, on the other hand, is only closed when the call button 18 is depressed.

DESCRIPTION OF OPERATION

When the handset 14 (FIG. 1) is removed from the cradle 12, the hookswitch HS1 (FIG. 3) closes and in combination with the normally closed contacts of the relay switch CO2 and the normally closed sequential switch CP10—9 energizes the control relay CO. The normally open relay switch CO1 (FIG. 2) thereupon closes and seizes the telephone line and the relay switches CO2 (FIG. 3) and CO3 transfer. The closure of the normally open contacts of the relay switch CO2 provides an alternate energization path for the control relay CO while the closure of the normally open contacts of the relay switch CO3 in combination with the normally closed sequential switch CP10—9 energizes the motor 42. The normally closed contacts of the relay switch CO2 open to prevent the closed normally open contacts thereof from providing an energization path for the motor 42, and the normally closed contacts of the relay switch CO3 open to prevent the normally open sequential switch CP10′—9 from providing an energization path for the motor while the control relay CO is energized.

The energized motor 42 rotates the armature 48 (FIG. 4) and as the armature moves out of the home position the normally open sequential switch CP8—9 closes (FIGS. 3 and 5) to provide a new energization path for the motor and the normally closed sequential switch CP10—9 opens to terminate the previous energization path. Then as the armature moves into the call position, the normally open sequential switches CP10′—9 and CP6—9 close to provide potential energization paths for the motor 42 and the normally open sequential switch CP8—9 reopens to terminate the energization of the motor. The armature therefore comes to rest in the call position.

Three things can now occur. First, the user upon hearing a dial tone can depress the call button 18 (FIG. 1) and initiate the dialing of the preselected telephone number by the automatic dialing means. Second, he can attempt to dial a telephone number of his own choosing by means of the hookswitch actuator, and third, he can abandon the call by returning the handset 14 to the cradle 12. These three alternative will now be examined.

ACTUATION OF CALL BUTTON

Depressing the call button 18 closes the call switch CL (FIG. 3) and completes an energization path for the motor 42 through the closed sequential switch CP6—9. The armature 48 (FIG. 4) is advanced out of the call position whereupon the normally open sequential switch CP8—9 (FIGS. 3 and 5) again closes to provide an alternate energization path for the motor 42. Thus the motor 42 remains energized when the user releases the call button 18. In addition, the energized motor 42 operates the normally open cam switch CAM (FIGS. 2 and 5) to apply bias voltage to the transistor 30 so that as the armature scans the pads of the stepping switches CP1—4 and CP2—5, multifrequency signals corresponding to the preselected telephone number are transmitted out on the telephone line.

After transmission of the multifrequency signals is completed, the cam switch CAM reopens to remove bias voltage from the transistor 30 and the armature moves into the talk position. The normally open sequential switch CP10′—9 (FIGS. 3 and 5) recloses to provide a potential energization path for the motor 42, and the normally open sequential switch CP8—9 reopens to terminate the energization of the motor. The armature therefore comes to rest in the talk position.

The telephone remains in the talk position while the user waits for the called station to answer and while he converses with the called station, and when the conversation is completed, the user returns the handset 14 (FIG. 1) to the cradle 12. The hookswitch HS1 (FIG. 3) is thereby reopened, interrupting the energization path for the control relay CO and the deenergized relay returns the relay switches to their normal condition.

The reopening of the relay switch CO1 (FIG. 2) drops the telephone line while the reclosing of the normally closed contacts of the relay switch CO3 (FIG. 3) provides an energization path for the motor 42 through the closed sequential switch CP10′—9. The motor 42 advances the armature from the talk position whereupon the sequential switch CP8—9 recloses to provide an alternate energization path and the sequential switch CP10′—9 reopens to interrupt the previous path. As the armature returns to the home position, the sequential switch CP10—9 recloses and the sequential switch CP8—9 reopens to terminate the operation of the motor 42 and return the telephone to a quiescent condition.

HOOKSWITCH DIALING ATTEMPT

If the user, instead of depressing the call button 18 (FIG. 1), attempts to dial a telephone number of his own choosing by means of the hookswitch actuator, he repetitively opens and closes the hookswitch HS1 (FIG. 3). The first time that the hookswitch HS1 opens, the control relay CO is deenergized and the relay switch CO1 (FIG. 3) opens to interrupt the telephone line. The relay switch CO2 (FIG. 3) returns to its normal condition, and since the sequential switch CO10—9 is open, the control relay CO cannot be reenergized when the hookswitch HS1 is reclosed. The control relay CO therefore remains deenergized and the telephone line is dropped.

The relay switch CO3 also return to normal condition, and consequently the motor 42 is energized through the normally closed contacts of the relay switch CO3 and the closed normally open sequential switch CP10′—9. Thereafter the energization of the motor 42 is alternatively maintained through the aforementioned path and through the closed normally open sequential switch CP8—9 until the armature reaches the home position wherein both paths are open.

If the user is still manipulating the hookswitch actuator at this time, the closure of the hookswitch contacts HS1 will again energize the control relay CO to reinitiate the operation of the telephone in the previously described manner. Thus it is seen that all that will be achieved by the user's attempt to dial with the hookswitch actuator is the dropping of the telephone line and the reseizing of the telephone line sometime later.

ABANDONMENT OF CALL

If the user, instead of depressing the call button 18 (FIG. 1), abandons the call by returning the handset 14 to the cradle 12, the hookswitch HS1 (FIG. 3) opens. As in the hookswitch dialing attempt, the control relay CO is deenergized and in the manner described the telephone line is dropped and the motor 42 is energized until the armature is returned to the home position. As a result the telephone is returned to a quiescent condition.

Although a specific embodiment of the invention has been shown and described, it will be understood that it is but illustrative and that various modifications may be made therein without departing from the scope and spirit of this invention as defined in the appended claims.

We claim:

1. A telephone associated with a telephone line comprising:
- a handset and a cradle for accommodating the handset when it is not in use;
- a hookswitch that is closed when the handset is removed from the cradle and opened when the handset is placed in the cradle;
- sequential switching means having first, second and third rest positions;
- a control relay energized responsive to the closure of the hookswitch when the sequential switching means is in the first rest position, the telephone line being seized and the sequential switching means advancing from the first rest position to the second rest position responsive to the energization of the control relay;
- a call initiating switch;
- means for automatically dialing a preselected telephone number responsive to the actuation of the call initiating switch when the sequential switching means is in the second rest position, the sequential switching means advancing to the third rest position responsive to the actuation of the call initiating switch; and
- the control relay being deenergized responsive to the opening of the hookswitch at any time, and the telephone line being dropped and the sequential switching means being advanced to the first rest position responsive to the deenergization of the control relay.

2. A telephone is as in claim 1 wherein the control relay is energized responsive to the closure of the hookswitch only when the sequential switching means is in the first rest position.

3. A telephone as in claim 1 wherein the automatic dialing means dials a preselected telephone number responsive to the actuation of the call initiating switch only when the sequential switching means is in the second rest position.

4. A telephone as in claim 1 wherein the control relay includes a switch in the telephone line that is closed when the relay is energized and opened when the relay is deenergized.

5. A telephone as in claim 1 wherein the automatic dialing means is motor driven, the energization of the motor being controlled by the sequential switching means, the control relay, and the call initiating switch.

6. A telephone associated with a telephone line comprising:
- telephone activating means;
- multipositional switching means having a home position;
- control means enabled responsive to the actuation of the telephone activating means when the switching means is in the home position, the telephone line being seized and the switching means advancing from the home position responsive to the enabling of the control means;
- means for dialing a preselected telephone number when the switching means is out of the home position; and
- the control means being disabled responsive to the deactuation of the telephone activation means and the telephone line being dropped and the switching means being returned to the home position responsive to the disabling of the control means.

7. A telephone as in claim 6 further including a handset and a cradle for accommodating the handset when it is not is use, the telephone activating means comprising a hookswitch that is closed when the handset is removed from the cradle and open when the handset is placed in the cradle.

8. A telephone as in claim 6 wherein the control means comprises a relay energized responsive to the actuation of the telephone activating means when the switching means is in the home position and deenergized responsive to the deactuation of the telephone activating means at any time.